(12) United States Patent
Peranandam et al.

(10) Patent No.: US 11,803,365 B2
(45) Date of Patent: Oct. 31, 2023

(54) SYSTEM AND PROCESS FOR VEHICLE SOFTWARE CONFIGURATION COVERAGE MEASUREMENT FOR UPDATE VALIDATION

(71) Applicant: GM Global Technology Operations LLC, Detroit, MI (US)

(72) Inventors: Prakash Mohan Peranandam, Rochester Hills, MI (US); Ramesh Sethu, Troy, MI (US); Arun Adiththan, Sterling Heights, MI (US); Muralikrishnan Kailasam, Troy, MI (US); Zhiqiang J. Zhou, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 85 days.

(21) Appl. No.: 17/704,728

(22) Filed: Mar. 25, 2022

(65) Prior Publication Data
US 2023/0305830 A1    Sep. 28, 2023

(51) Int. Cl.
*G06F 8/65* (2018.01)
(52) U.S. Cl.
CPC ..................... *G06F 8/65* (2013.01)
(58) Field of Classification Search
None
See application file for complete search history.

(56) References Cited

U.S. PATENT DOCUMENTS

| | | | |
|---|---|---|---|
| 9,342,489 B2 | 5/2016 | Sethu et al. | |
| 10,401,937 B2 | 9/2019 | Darin et al. | |
| 10,534,368 B2 | 1/2020 | Sethu et al. | |
| 11,718,310 B2 * | 8/2023 | Jung | B60W 50/06 717/169 |
| 2015/0081729 A1 | 3/2015 | Rajpathak et al. | |
| 2015/0286712 A1 | 10/2015 | Donndelinger et al. | |
| 2016/0179868 A1 | 6/2016 | Rajpathak et al. | |
| 2016/0225201 A1* | 8/2016 | Hiroki | H04L 67/12 |
| 2017/0213222 A1 | 7/2017 | Rajpathak et al. | |
| 2021/0056779 A1 | 2/2021 | Adiththan et al. | |

(Continued)

OTHER PUBLICATIONS

IPCOM000134413D, Anonymous, 2006, IP.com (Year: 2006).*

*Primary Examiner* — Hossain M Morshed
(74) *Attorney, Agent, or Firm* — Vivacqua Crane PLLC

(57) ABSTRACT

A system is provided for updating vehicle software configurations for multiple vehicles. The system includes a network having multiple ECUs carried by the vehicles, with each ECU having an ECU software configuration including software components with one or more versions. The system further includes a network appliance having a processor communicating with the ECUs and a computer readable medium. The processor is programmed to identify coverage points for software components. The processor is further programmed to collect clusters for validating an update of the associated software components and determine optimal sets of clusters, which is less than or equal to a total of the clusters. The processor is further programmed to rank the clusters of the selected optimal set, based on a vehicle coverage percentage of each cluster, and transmit the optimal set for software configuration validation and then finally transmit the validated update to the associated vehicle ECUs.

20 Claims, 6 Drawing Sheets

(56) References Cited

U.S. PATENT DOCUMENTS

| | | | |
|---|---|---|---|
| 2021/0253047 A1* | 8/2021 | Okada | B60R 16/0238 |
| 2022/0012043 A1* | 1/2022 | Sakurai | H04L 63/12 |
| 2022/0301359 A1* | 9/2022 | Takei | G07C 5/0808 |

\* cited by examiner

Cluster Volume Info:
c1 = 70
c2 = 30
c3 = 120
c4 = 30
c5 = 100
c6 = 30
c7 = 100

FIG. 5

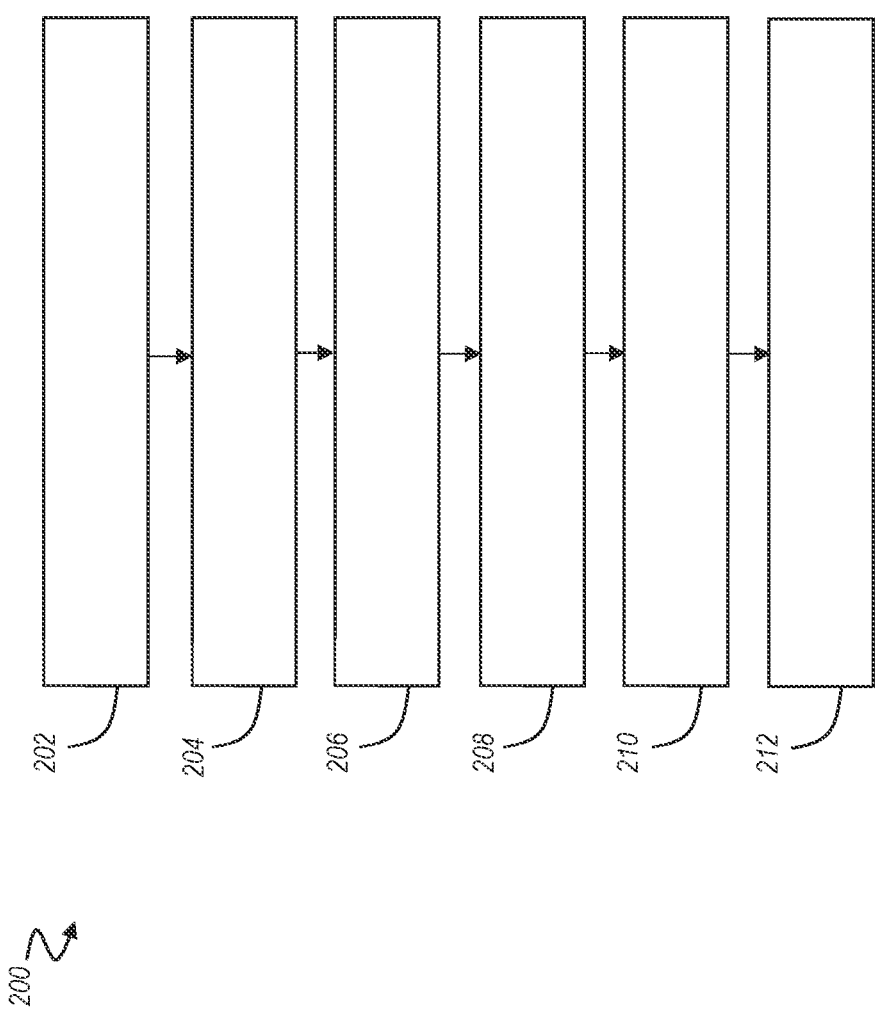

SYSTEM AND PROCESS FOR VEHICLE SOFTWARE CONFIGURATION COVERAGE MEASUREMENT FOR UPDATE VALIDATION

INTRODUCTION

The present disclosure relates to adaptive monitoring of network data to optimize network performance, and more particularly to a system and process for identifying an optimal set of field vehicle software configurations by evaluating vehicle configuration risk for a given field vehicle software update.

Automotive manufacturers currently produce vehicles having a set of Electronic Control Units (ECUs), which execute and interact with one another to enable a functionality. Each ECU has a set of software components with multiple versions of each software component. Examples of the software components can include application software components, operational software components, calibration software components, utility software components, and the like. Unique combinations of versions of the software components form an ECU software configuration, and a combination of all such ECU software configurations can form a vehicle software configuration. A population of vehicles of the same model and trim can have different vehicle software configurations, and a population of vehicles of different models and trim can have common vehicle software configurations with common modules (e.g., body control modules, infotainment modules, etc.) and common ECU software configurations. The significant amount of network data transmitted to the ECUs of these vehicles could result in network congestion, delay, packet loss, or jitter.

Thus, while existing systems and processes for updating and validating vehicle software configurations of motor vehicles may achieve their intended purpose, there is a need for a new and improved system and processes that updates and validates vehicle software configurations to help address these issues.

SUMMARY

According to several aspects of the present disclosure, a network appliance of a system is provided for updating and validating multiple vehicle software configurations for a plurality of motor vehicles. The system includes a network having a plurality of ECUs carried by the motor vehicles, with each ECU having an ECU software configuration including multiple software components having one or more versions. The ECU software configurations create the vehicle software configuration for the associated motor vehicles. The network apparatus includes one or more processors communicating with the ECUs and a non-transitory computer readable storage medium (CRM) storing instructions. The processor is programmed to collect data associated with the ECU software configurations for each of the motor vehicles. The processor is further programmed to determine multiple clusters based on the data associated with the ECU software configurations for each of the motor vehicles. Each cluster is associated with a portion of the motor vehicles that have a common vehicle software configuration. The processor is further programmed to identify a plurality of n-tuple coverage points, with each of the coverage points including one or more current versions of the associated software components and one or more update versions of one or more update software components. The processor is further programmed to determine one or more optimal sets of clusters. Each optimal set of clusters is less than or equal to a total set of the clusters, with each optimal set of clusters covering all of the coverage points. The processor is further programmed to rank the clusters of the optimal sets based on a vehicle coverage percentage of each cluster. The processor is further programmed to transmit the optimal set of clusters with the highest vehicle coverage percentage to the ECUs of the associated motor vehicles based on a rank of the clusters.

In one aspect, the processor is further programmed to determine that the software components of the ECUs are associated with the coverage points to be updated based on an interaction matrix dependency table, with the ECUs including a target ECU and one or more dependent ECUs.

In another aspect, the processor is further programmed to map the clusters and the associated coverage points to one another, generate a structural coverage tree, and determine the optimal set of the clusters based at least on the structural coverage tree.

In another aspect, the processor is further programmed to determine an adjusted volume by identifying each of the cluster from the optimal set with a highest coverage and adding the coverage of the related clusters that are outside of the optimal sets. The processor is further programmed to divide the adjusted volume by a total volume for all of the clusters to determine the cluster ranks.

According to several aspects of the present disclosure, a system is provided for updating and validating a plurality of vehicle software configurations for a plurality of motor vehicles. The system includes a network having a plurality of ECUs carried by the motor vehicles. Each ECU has an ECU software configuration, which includes multiple software components having one or more versions. The ECU software configurations create the vehicle software configuration for the associated motor vehicles. The system further includes a network appliance having one or more processors communicating with the ECUs. The network appliance further includes a non-transitory computer readable storage medium (CRM) storing instructions. The processor is programmed to collect data associated with the ECU software configurations for each of the motor vehicles. The processor is further programmed to determine multiple clusters based on the data associated with the ECU software configurations for each of the motor vehicles. Each cluster is associated with a portion of the motor vehicles that have a common vehicle software configuration. The processor is further programmed to identify a plurality of n-tuple coverage points, with each coverage point including one or more current versions of the associated software components and one or more update versions of one or more update software components. The processor is further programmed to determine one or more optimal sets of clusters based on the coverage points. Each optimal set of clusters is less than or equal to a total set of the clusters, and each optimal set covers all of the coverage points. The processor is further programmed to rank the clusters of the optimal sets based on the adjusted vehicle volume coverage percentage of each cluster. The processor is further programmed to transmit the optimal set of ranked clusters for the update validation of each software configuration.

In one aspect, the ECUs include an Automatic Park Assist Control Module, an Electronic Brake Control Module, and/or an Electric Power Steering Module.

In another aspect, the processor is further programmed to determine that the software components of the ECUs are associated with the coverage points to be updated based on an interaction matrix dependency table, with the ECUs including a target ECU and one or more dependent ECUs.

In another aspect, the processor is further programmed to map the clusters and the associated coverage points to one another, generate a structural coverage tree, and determine the optimal set of the clusters based at least on the structural coverage tree.

In another aspect, the processor is further programmed to identify the clusters for associated coverage points.

In another aspect, the processor is further programmed to determine the associated cluster is part of the optimal set.

In another aspect, the processor is further programmed to determine the vehicle coverage percentage by dividing a sum of the clusters associated with a common one of the coverage points by a total volume for all of the clusters.

In another aspect, the processor is further programmed to determine an adjusted volume by identifying the cluster of one optimal set with a highest coverage and adding a coverage of the related clusters outside the optimal sets. The processor is further programmed to divide the adjusted volume by a total volume for all of the clusters.

According to several aspects of the present disclosure, a process is provided for operating a system to update and validate a plurality of vehicle software configurations for a plurality of motor vehicles. The system includes a network having multiple ECUs carried by the motor vehicles. Each ECU has an ECU software configuration including multiple software components having one or more versions. The ECU software configurations create the vehicle software configuration for the associated motor vehicles. The system further includes a network appliance having one or more processors and a non-transitory computer readable storage medium storing instructions. The process includes collecting, using the processor, data associated with the ECU software configurations for each of the motor vehicles. The process further includes determining, using the processor, multiple clusters based on the data associated with the ECU software configurations for each of the motor vehicles, with each of the clusters being associated with a portion of the motor vehicles that have a common vehicle software configuration. The process further includes identifying, using the processor, a plurality of n-tuple coverage points, with each of the coverage points includes one or more current versions of the associated software components and one or more update versions of one or more update software components. The process further includes determining, using the processor, one or more optimal sets of the clusters based on the coverage points. Each optimal set of clusters is less than or equal to a total set of the clusters, and each one optimal set of clusters covers all of the coverage points. The process further includes ranking, using the processor, the clusters of the optimal set based on a vehicle coverage percentage of each of the clusters. The process further includes transmitting, using the processor, the optimal set of clusters for the update validation of each software configuration.

In one aspect, the process further includes determining, using the processor, that the software components of the ECUs are associated with the coverage points to be updated based on an interaction matrix dependency table, with the ECUs including a target ECU and one or more dependent ECUs.

In another aspect, the process further includes mapping, using the processor, the clusters and the associated coverage points to one another. The process further includes generating, using the processor, a structural coverage tree. The process further includes determining, using the processor, the optimal set of the clusters based at least on the structural coverage tree.

In another aspect, the process further includes executing, using the processor, a Boolean expression optimization to determine the optimal set of the clusters.

In another aspect, the process further includes identifying, using the processor, each of the clusters for an associated one of the versions of the software components.

In another aspect, the process further includes determining, using the processor, the associated cluster is part of the at least one optimal set.

In another aspect, the process further includes determining, using the processor, the vehicle coverage percentage by dividing a sum of the clusters associated with a common one of the coverage points by a total volume for all of the clusters.

In another aspect, the process further includes determining, using the processor, an adjusted volume by identifying the cluster of one optimal set with a highest coverage and adding a coverage of the related clusters outside of the optimal set. The process further includes dividing, using the processor, the adjusted volume by a total coverage provided by the total of the clusters.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 5 is a Cluster Volume Table indicating a volume of vehicles to be updated by an associated one of the clusters of FIG. 3.

FIG. 6 is a flow chart of one non-limiting example of a process for operating the system of FIG. 1.

DETAILED DESCRIPTION

Figure 1:
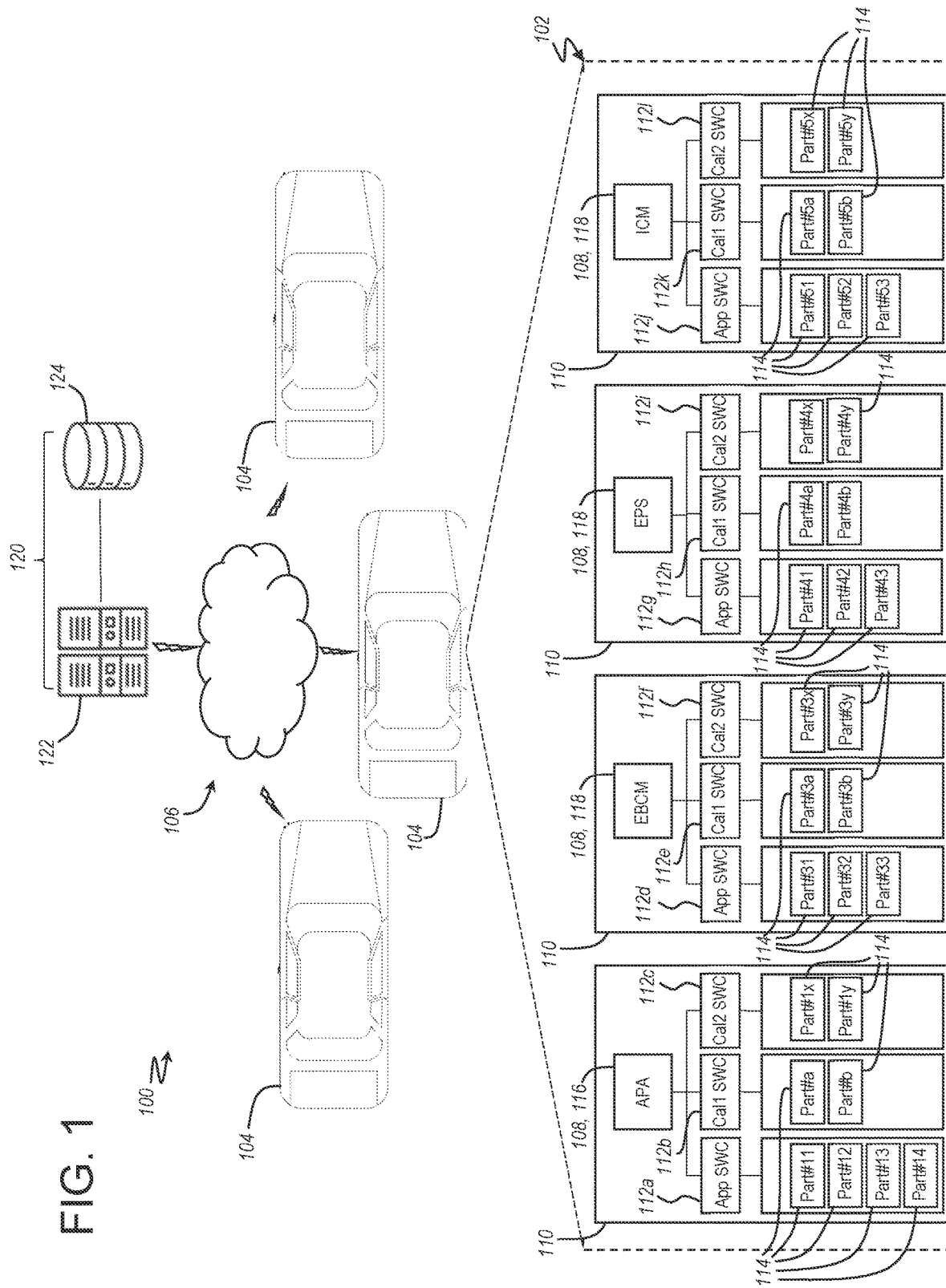
FIG. 1 is a schematic view of one non-limiting example of a system having a network with a plurality of Electronic Control Units (ECUs) forming a vehicle software configuration carried by associated motor vehicles, with the system further including a network appliance having one or more processors and a non-transitory computer readable storage medium for updating and validating the ECUs.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, one non-limiting example of system 100 is provided for updating and validating a vehicle software configuration 102 for an associated one of a plurality of motor vehicles 104. While FIG. 1 illustrates one vehicle software configuration 102 of one of the vehicles 104, each of the vehicles 104 has a vehicle software configuration associated with its VIN (e.g., make, model, and production year). The system 100 includes a network 106 having a plurality of ECUs 108 carried by the motor vehicles 104, with each ECU 108 having an ECU software configuration 110. Each ECU software configuration 110 can include a plurality of software components 112 having one or more versions 114. The ECU software configurations 110 form the vehicle software configuration 102 for the associated motor vehicles 104.

In this non-limiting example, one motor vehicle 104 can have multiple ECUs 108 including a target ECU 116 and one or more dependent ECUs 118 interacting with the target ECU 116 to perform a functionality. More specifically, in this non-limiting example, the target ECU 116 can include an Automatic Park Assist ("APA") Control Module, and the dependent ECUs 118 can include an Electronic Brake Control Module (EBCM), an Electric Power Steering Control Module ("EPS"), and an Infotainment Control Module ("ICM"). As described in detail below, the APA can run software that enables the Automatic Park Assist feature by interacting with the EBCM and the EPS to execute the Automatic Park Assist functionality. It is contemplated that other non-limiting examples of the ECUs can include a Body Control Module, an Infotainment Control Module, or an ECU for other suitable control modules. While the illustrated non-limiting example of the motor vehicle includes multiple control modules, with each control module having a unique ECU, other non-limiting examples of a motor vehicle can have other suitable control modules and ECUs or a single central computing platform with a single ECU having a unique combination of versions of software components, which form the vehicle software configuration and perform all the functionalities of the ECUs in the illustrated non-limiting example.

Each ECU 108 can include one or more software components, with each software component having one or more existing versions. Continuing with the previous non-limiting example, the APA can include an application software component 112a having one of three existing versions 114, namely "Part #11," "Part #12," and "Part #13." The APA can include a first calibration software component 112b having one of two existing versions 114, namely "Part #a" and "Part #b." The APA can include a second calibration software component 112c having one of two existing versions 114, namely "Part #1x" and "Part #1y." Furthermore, the EBCM can include a second software component 112d having one or three existing versions 114, namely "Part #31," "Part #32," and "Part #33." The EBCM can include a first calibration software component 112e having one of two existing versions 114, namely "Part #3a" and "Part #3b." The EBCM can include a second calibration software component 112f having one of two existing versions 114, namely "Part #3x" and "Part #3y." In addition, the EPS can include an application software component 112g having one of three existing versions 114, namely "Part #41," "Part #42," and "Part #43." The EPS can include a first calibration software component 112h having one of two existing versions, namely "Part #4a" and "Part #4b." The EPS includes a second calibration software component 112i having one of two existing versions 114, namely "Part #4x" and "Part #4y." The ICM can include an application software component 112j having one of three existing versions 114, namely "Part #51," "Part #52," and "Part #53." The ICM can include a first calibration software component 112k having one of two existing versions 114, namely "Part #5a" and "Part #5b." The ICM includes a second calibration software component 112l having one of two existing versions 114, namely "Part #5x" and "Part #5y." It is contemplated that each ECU can include one or more software components with more than one version. As described in detail below, the system 100 can update or replace the versions 114 of one or more software components.

The system 100 further includes a network appliance 120, which has one or more processors 122 communicating with the ECUs 108 to update the ECUs by replacing all or part of the versions 114 of the software components. The network appliance 120 further includes a non-transitory computer readable storage medium 124 (CRM) storing instructions.

The processor 122 is programmed to collect data associated with the ECU software configurations 110 for each of the motor vehicles 104. The processor 122 is further programmed to determine a plurality of clusters based on the data associated with the ECU software configurations 110 for each of the motor vehicles 104, with each of the clusters associated with a portion of the motor vehicles 104 having a common vehicle software configuration 102.

Figure 2:
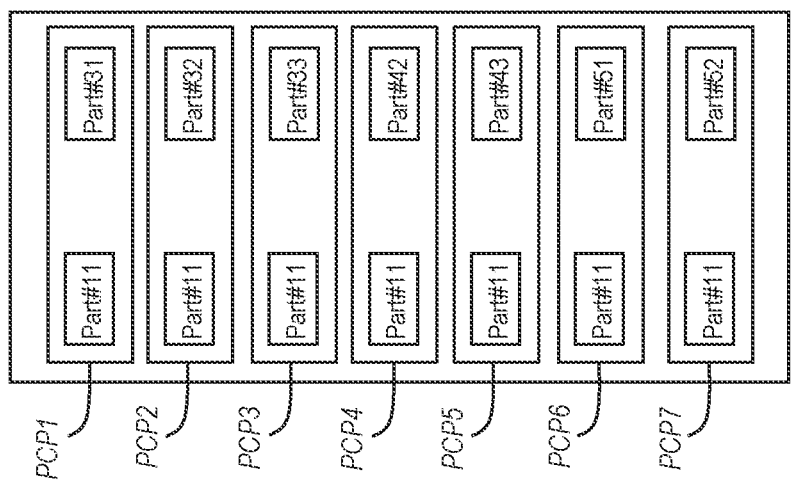
FIG. 2 is an Interaction Matrix Dependency Table for Pairwise Coverage Points directed to two versions of software components of the ECUs of FIG. 1.

The processor 122 is further programmed to identify a plurality of n-tuple coverage points 126 (FIGS. 2 and 3), with each of the coverage points 126 including one or more current versions 114 of the associated software components 112 and one or more update versions 114 one or more update software components. The processor 112 is configured to determine the software components 112 of the ECUs 108 that are associated with n-tuple coverage points to be updated based on an interaction matrix dependency table. The system 100 updates a target ECU 116, in response to the system 100 determines that the updated target ECU 116 will function correctly with the software components of the dependent ECUs 118. The n-tuple is the number of required communications between the target ECU 116 and the dependent ECUs 118. For example, 3 dependent ECUs 118 can have 2-tuple, 3-tuple, or a maximum of 4-tuple ECU application software interactions coverage points, depending on the validation requirements of the updating ECU(s) 116 and the dependent ECUs 118.

Figure 3:
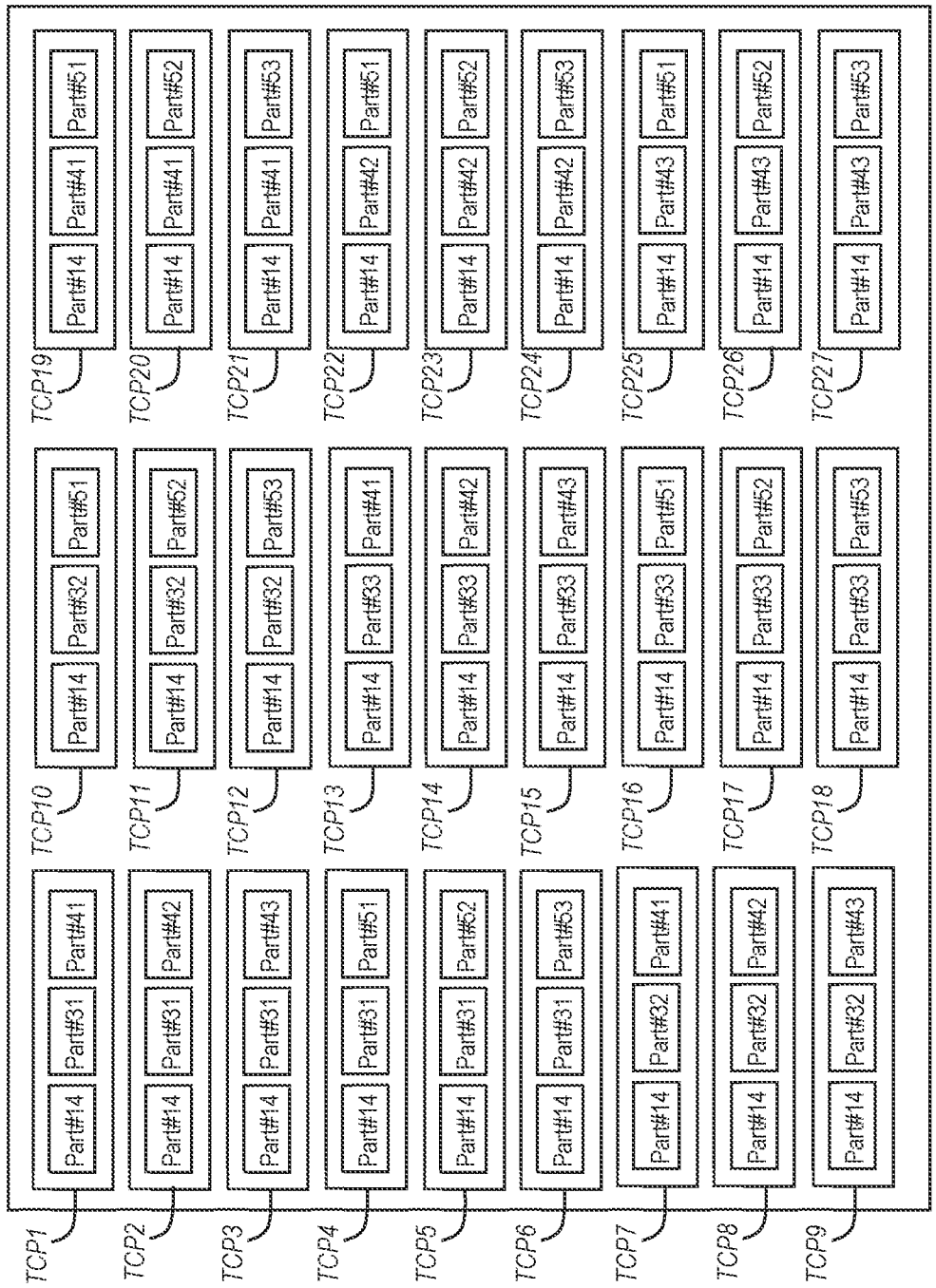
FIG. 3 is an Interaction Matrix Dependency Table for Triplet Coverage Points directed to three versions of software components of the ECUs of FIG. 1.

Continuing with the previous example, the system 100 can use the updated version Part #14 to update the APA and validate the version Part #14 by determining that the version Part #14 is functioning properly with all the other dependent ECUs 118. As shown in the non-limiting example of FIG. 2, version Part #14 can be validated based on seven (7) Pairwise Coverage Points PCP1 to PCP9, with version Part #14 being paired with associated versions 114 of software components 112 of the dependent ECUs 118 that are interacting with the target ECU 116. As shown in FIG. 3, version Part #14 can be validated based on twenty-seven (27) Triplet Coverage Points TCP1 to TCP27. It is contemplated that the n-tuple coverage points can be more than triplet coverage points, with each coverage point being associated with other suitable numbers of software components.

Figure 4:
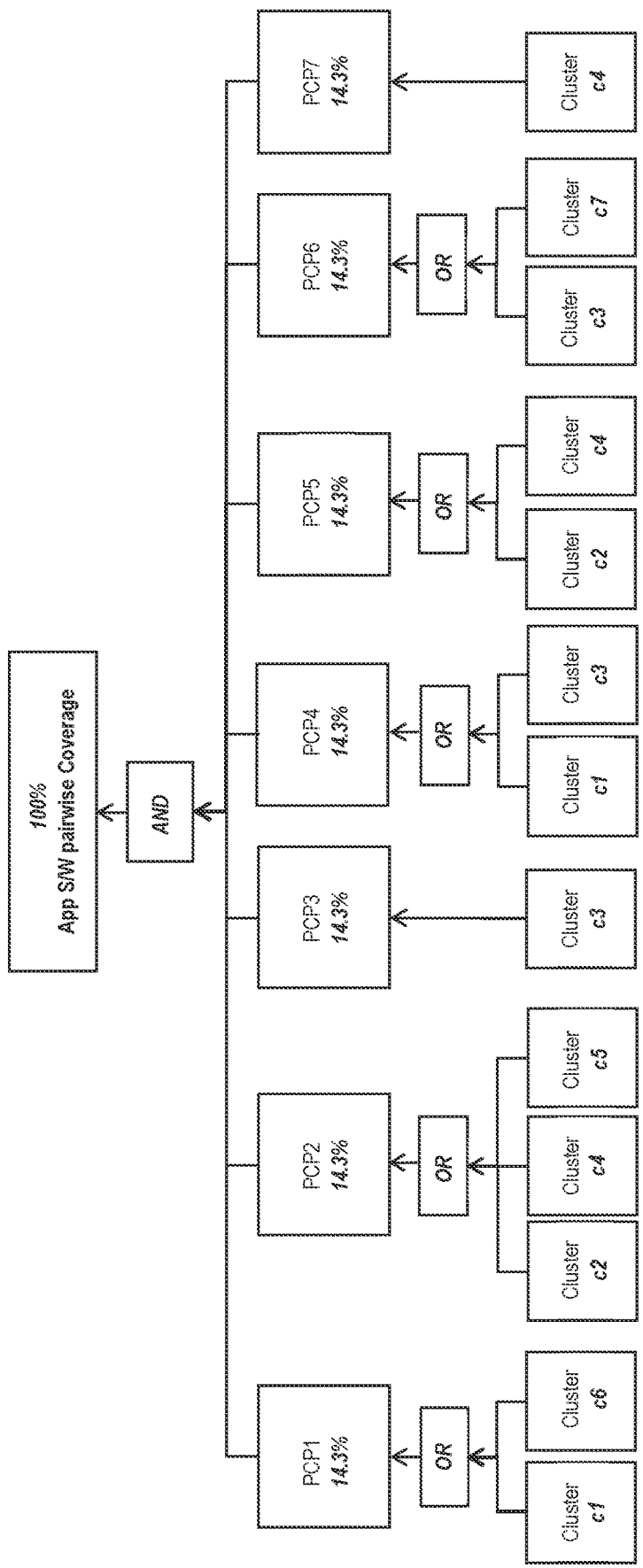
FIG. 4 is a schematic diagram mapping the Pairwise Coverage Points to clusters of FIG. 2, based on the coverage by the clusters.

The processor 122 is further programmed to determine one or more optimal sets of the clusters, with each optimal set having a number of clusters that is less than or equal to a total number of the clusters and further with each optimal set covering all of the n-tuple coverage points. More specifically, as shown in the non-limiting example of FIG. 4, the processor 122 is further programmed to map the clusters and the associated coverage points to one another, generate a structural coverage tree, and determine the optimal set of the clusters based at least on the structural coverage tree. The processor 122 is further programmed to execute a Boolean expression optimization to determine the optimal set of the clusters. Continuing with the previous non-limiting example, Pairwise Coverage Points PCP1 to PCP7 is represented by Boolean Equation 1. Exemplary clusters c1 to c7 are mapped to Pairwise Coverage Points PCP1 to PCP7 as expressed by Boolean Equation 2 and based on the structural coverage tree (FIG. 4). Two (2) optimal sets [c1, c3, c4] and [c3, c4, c6] include only clusters c1, c3, c4, c6, and are represented by Boolean Equation 3:

$$PCP1\& \ PCP2\& \ PCP3\& \ PCP4\& \ PCP5\& \ PCP6\& \ PCP7l \qquad \text{Eq.1}$$

$$(c1\|c6)\&(c2\|c4\|c5)\&(c3)\&(c1\|c3)\&(c2\|c4)\&(c3\|c7)\&(c4) \qquad \text{Eq.2}$$

$$[c1\& \ c3\& \ c4]\|[c3\& \ c4\& \ c6] \qquad \text{Eq. 3}$$

The processor 122 is further programmed to perform optionally by selecting one of the optimal sets and executing a comprehensive vehicle volume coverage analysis of that selected optimal cluster set by ranking each cluster of the selected optimal set based on a vehicle coverage percentage. More specifically, the processor 122 is programmed to identify each of the clusters associated with each common coverage point. Continuing with the previous non-limiting example and as shown in FIG. 4, cluster c1 is associated with cluster c6 for the common coverage point PCP1 and further associated with cluster c3 for the common coverage point PCP4. Cluster c2 is associated with clusters c4, c5 for the common coverage point PCP2 and further associated with cluster c4 for the common coverage point PCP5. Cluster c3 is associated with cluster c1 for the common coverage point PCP4 and further associated with cluster c7 for the common coverage point PCP6. Cluster c4 is associated with clusters c2, c5 for the common coverage point PCP2 and further associated with cluster c2 for the common coverage point PCP5. Cluster c5 is associated with clusters c2, c4 for the common coverage point PCP2. Cluster c6 is associated with cluster c1 for the common coverage point PCP1. Cluster c7 is associated with cluster c3 for the common coverage point PCP6.

The processor 122 is further programmed to determine that each cluster is part of the selected optimal sets (Eq. 3) and execute the adjusted volume information for each of the clusters (FIG. 5) that are part of one or more optimal sets, with the volume information being retrieved from, e.g., the CRM 124. More specifically, the volume or number of vehicles that require updates by clusters c1 to c7 are determined. The processor 122 is programmed to identify the clusters associated with each common coverage point (FIG. 4), determine the cluster with the highest volume (FIG. 5), and add the volume of the other clusters to the highest volume to determine an adjusted volume. The processor 122 is further programmed to determine the vehicle coverage percentage by dividing the adjusted volume by a total volume for all of the clusters. Continuing with the previous non-limiting example and as based on Equations 1-3 and FIGS. 4 and 5, the processor 122 can be programmed to determine that the first cluster c1 from the selected optimal set and the sixth cluster c6 is associated with the common coverage point PCP1. The processor 122 can be further programmed to determine that the first cluster c1 has a volume of 70 vehicles. The processor 122 can be further programmed to determine that the sixth cluster c6 is not part of the selected optimal set and is not associated with any of the other clusters of the selected optimal set for any other coverage points, and the sixth cluster c6 has a volume of 30 vehicles. The processor 122 adds the volume of 30 vehicles associated with the sixth cluster c6 to the volume of 70 vehicles associated with first cluster c1 to determine an adjusted volume of 100 vehicles for the optimal sets covering the common coverage point PCP1. The processor 122 determines a vehicle coverage percentage of 20.9% by dividing the adjusted volume of 100 vehicles by a total volume of 480 vehicles associated with the clusters c1 to c7. Furthermore, the processor 122 can be programmed to determine the next cluster from the selected optimal set, e.g., the third cluster c3, and all the associated clusters with respect to the coverage points and results in the first cluster c1 and the seventh cluster c7. Given that the first cluster c1 is part of the selected optimal set and has its own rank, the processor 122 considers the remaining seventh cluster c7 is associated with the third cluster c3 with respect to the common coverage point PCP6. The processor 122 determines that the third cluster c3 has a volume of 120 vehicles and the seventh cluster c7 is not part of the selected optimal set and also is not associated with other clusters on any other coverage points. The processor adds the volume of 100 associated with cluster c7 to the volume of 120 associated with cluster c3 to determine an adjusted volume of 220 for optimal sets covering the common coverage point PCP6. The processor 122 determines a vehicle coverage percentage of 45.8% by dividing the adjusted volume of 220 by a total volume of 480 associated with the clusters c1 to c7. In addition, the processor 122 can be programmed to determine that the fourth cluster c4 from the selected optimal set and all the associated clusters with respect to the coverage points and results in c2 and c5. The processor 122 determines that the second cluster c2 and the fifth cluster c5 are not associated with other clusters of the selected optimal set with respect to any of the coverage points and has a volume of 30 vehicles and 100 vehicles respectively. The processor adds the volume of 30 associated with cluster c2 and the volume of 30 associated with cluster c4 to the volume of 100 associated with cluster c5 to determine an adjusted volume of 260 for optimal sets covering the common coverage point PCP2. The processor 122 determines a vehicle coverage percentage of 33.3% by dividing the adjusted volume of 160 by a total volume of 480 associated with the clusters c1 to c7. The processor 122 can be further programmed to determine a cluster that is not part of the selected optimal set but associated with multiple clusters of the selected optimal set with respect to different coverage points, then it is combined with the cluster that has the maximum adjusted volume. Based on the vehicle coverage percentages of the clusters, the processor can rank the clusters and perform a risk analysis of updating the ECUs with respect to the field vehicle configurations.

Referring now to FIG. 6, one non-limiting example of a process 200 is provided for operating the system 100 of FIG. 1. The process 200 begins at block 202 with collecting, using the processor 122, data associated with the ECU software configurations 110 for each of the motor vehicles 104.

At block 204, the process 200 further includes determining, using the processor 122, the clusters based on the data associated with the ECU software configurations 110 for each of the motor vehicles 104, with each of the clusters associated with a portion of the motor vehicles 104 having a common vehicle software configuration.

At block 206, the process 200 further includes identifying, using the processor 122, a plurality of n-tuple coverage points, with each coverage point including one or more current versions of the associated software components 112 and one or more update versions of one or more update software components.

At block 208, the process 200 further includes determining, using the processor 122, one or more optimal sets of clusters, with the number of clusters in each optimal set being less than or equal to a total number of all the clusters. Each optimal set of clusters covers all of the software components and associated coverage points.

At block 210, the process 200 further includes ranking, using the processor 122, the clusters of the optimal sets based on a vehicle coverage percentage of each of the clusters. More specifically, the process 200 includes determining, using the processor 122, that the software components 112 of the ECUs 108 are associated with the coverage points to be updated based on an interaction matrix dependency table, with the ECUs 108 including a target ECU 116 and one or more dependent ECUs 118. The process 200 further includes mapping, using the processor 122, the clusters and the associated coverage points to one another by generating a structural coverage tree and identifying each cluster for the associated versions of software components. The process 200 further includes determining, using the processor 122, the optimal set of the clusters based at least on the structural coverage tree. The process 200 further includes determining, using the processor 122, that the associated cluster is part of one or more the optimal sets. In this non-limiting example, the process 200 includes executing, using the processor 122, a Boolean expression optimization to determine one or more the optimal sets of clusters.

The process 200 further includes determining, using the processor 122, the vehicle coverage percentage by dividing the sum of the clusters associated with a common one of the coverage points by a total volume for all of the clusters. More specifically, the process 200 further includes identifying, using the processor 122, two or more clusters that are associated with a common coverage point and classified within two or more optimal sets of clusters. The process 200 further includes determining, using the processor 122, an adjusted volume by identifying the cluster of one optimal set with a highest coverage and adding a coverage of the clusters of the other optimal sets. The process 200 further includes dividing, using the processor 122, the adjusted volume (e.g., a sum of the clusters associated with a common one of the coverage points) by a total volume provided by the total volume of the clusters.

At block 212, the process 200 further includes transmitting, using the processor 122, the optimal set of the clusters with the highest vehicle coverage percentage to the associated ECUs of the motor vehicles.

Computers and computing devices generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, JAVA, C, C++, MATLAB, SIMUEDGE, STATEFLOW, VISUAL BASIC, JAVA SCRIPT, PERL, HTML, TENSORFLOW, PYTHON, PYTORCH, KERAS, etc. Some of these applications may be compiled and executed on a virtual machine, such as the JAVA virtual machine, the DALVIK virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The CRM (also referred to as a processor readable medium) participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In some examples, system elements may be implemented as computer readable instructions (e.g., software) on one or more computing devices, stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A network appliance of a system for updating and validating a plurality of vehicle software configurations for a plurality of motor vehicles, the system including a network having a plurality of ECUs carried by the motor vehicles, with each of the ECUs having an ECU software configuration including a plurality of software components, and the ECU software configurations forming the vehicle software configurations for the associated motor vehicles, the network appliance comprising:
at least one processor communicating with the plurality of ECUs; and
a non-transitory computer readable storage medium storing instructions such that the at least one processor is programmed to:
collect data associated with the ECU software configurations for each of the motor vehicles;
determine a plurality of clusters based on the data associated with the ECU software configurations for each of the motor vehicles, with each of the clusters associated with a portion of the motor vehicles having a common vehicle software configuration;
identify a plurality of n-tuple coverage points, with each of the coverage points comprising at least one current version of the associated software components and at least one update version of at least one update software components;
determine at least one optimal set of the clusters based on the coverage points, with each of the optimal sets of clusters being less than or equal to a total set of the clusters, and each of the optimal sets of clusters covering all of the coverage points;
rank the clusters of the at least one optimal set based on a vehicle coverage percentage of each of the clusters; and
transmit the optimal set of the ranked clusters for software configuration validation and finally transmit the updates to the associated ECUs of the associated motor vehicles.

2. The network appliance of claim 1 wherein the at least one processor is further programmed to determine that the software components of the plurality of ECUs are associated with the coverage points to be updated based on an interaction matrix dependency table, with the plurality of ECUs including a target ECU and at least one dependent ECU.

3. The network appliance of claim 2 wherein the at least one processor is further programmed to:
map the clusters and the associated coverage points to one another;
generate a structural coverage tree; and
determine the optimal set of the clusters based at least on the structural coverage tree.

4. The network appliance of claim 3 wherein the at least one processor is further programmed to:
determine an adjusted volume by identifying the cluster of one optimal set with a highest coverage and adding a coverage of the clusters of the other optimal sets; and
divide the adjusted volume by a total volume for all of the clusters.

5. A system for updating and validating a plurality of vehicle software configurations for a plurality of motor vehicles, the system comprising:
a network including a plurality of ECUs carried by the motor vehicles, with each of the ECUs having an ECU software configuration including a plurality of software components having at least one version, and the ECU software configurations forming the vehicle software configurations for the associated motor vehicles; and
a network appliance including at least one processor communicating with the plurality of ECUs and a non-transitory computer readable storage medium storing instructions such that the at least one processor is programmed to:
collect data associated with the ECU software configurations for each of the motor vehicles;
determine a plurality of clusters based on the data associated with the ECU software configurations for each of the motor vehicles, with each of the clusters associated with a portion of the motor vehicles having a common vehicle software configuration;
identify a plurality of n-tuple coverage points, with each of the coverage points comprising at least one current version of the associated software components and at least one update version of at least one update software components;
determine at least one optimal set of the clusters based on the coverage points, with each of the optimal sets of clusters being less than or equal to a total set of the clusters, and each of the optimal sets covering all of the coverage points;
rank the clusters of the at least one optimal set based on a vehicle coverage percentage of each of the clusters; and
transmit the optimal set of the clusters with the highest vehicle coverage percentage to the associated ECUs of the associated motor vehicles based on a rank of the clusters.

6. The system of claim 5 wherein the plurality of ECUs comprises at least one of an Automatic Park Assist Control Module, an Electronic Brake Control Module, and/or an Electric Power Steering Module.

7. The system of claim 5 wherein the at least one processor is further programmed to determine that the software components of the plurality of ECUs are associated with the coverage points to be updated based on an interaction matrix dependency table, with the plurality of ECUs including a target ECU and at least one dependent ECU.

8. The system of claim 7 wherein the at least one processor is further programmed to:
map the clusters and the associated coverage points to one another;
generate a structural coverage tree; and
determine the optimal set of the clusters based at least on the structural coverage tree.

9. The system of claim 8 wherein the at least one processor is further programmed to identify each of the clusters for an associated one of the coverage points.

10. The system of claim 9 wherein the at least one processor is further programmed to determine the associated cluster is part of the at least one optimal set.

11. The system of claim 10 wherein the at least one processor is further programmed to determine the vehicle coverage percentage by dividing a sum of the clusters associated with a common one of the coverage points by a total volume for all of the clusters.

12. The system of claim 11 wherein the at least one processor is further programmed to:
 determine an adjusted volume by identifying the cluster of one optimal set with a highest coverage and adding a coverage of the clusters of the other optimal sets; and
 divide the adjusted volume by a total volume for all of the clusters.

13. A process for operating a system to update and validate a plurality of vehicle software configurations for a plurality of motor vehicles, with the system including a network including a plurality of ECUs carried by the motor vehicles, with each of the ECUs having an ECU software configuration including a plurality of software components having at least one version, and the ECU software configuration of the plurality of ECUs forming the vehicle software configurations for the associated motor vehicles, and the system further including a network appliance including at least one processor and a non-transitory computer readable storage medium storing instructions, the process comprising:
 collecting, using the at least one processor, data associated with the ECU software configurations for each of the motor vehicles;
 determining, using the at least one processor, a plurality of clusters based on the data associated with the ECU software configurations for each of the motor vehicles, with each of the clusters associated with a portion of the motor vehicles having a common vehicle software configuration;
 identifying, using the at least one processor, a plurality of n-tuple coverage points, with each of the coverage points comprising at least one current version of the associated software components and at least one update version of at least one update software components;
 determining, using the at least one processor, at least one optimal set of the clusters based on the coverage points, with each of the optimal sets of clusters being less than or equal to a total set of the clusters, and each of the at least one optimal set of clusters covering all of the coverage points;
 ranking, using the at least one processor, the clusters of the at least one optimal set based on a vehicle coverage percentage of each of the clusters; and
 transmitting, using the at least one processor, the optimal set of the clusters for validation and then to the associated ECUs of the associated motor vehicles.

14. The process of claim 13 further comprising determining, using the at least one processor, that the software components of the plurality of ECUs are associated with the coverage points to be updated based on an interaction matrix dependency table, with the plurality of ECUs including a target ECU and at least one dependent ECU.

15. The process of claim 14 further comprising:
 mapping, using the at least one processor, the clusters and the associated coverage points to one another;
 generating, using the at least one processor, a structural coverage tree; and
 determining, using the at least one processor, the optimal set of the clusters based at least on the structural coverage tree.

16. The process of claim 15 further comprising executing, using the at least one processor, a Boolean expression optimization to determine the optimal set of the clusters.

17. The process of claim 16 further comprising identifying, using the at least one processor, each of the clusters for an associated one of the versions of the software components.

18. The process of claim 17 further comprising determining, using the at least one processor, the associated cluster is part of the at least one optimal set.

19. The process of claim 18 further comprising determining, using the at least one processor, the vehicle coverage percentage by dividing a sum of the clusters associated with a common one of the coverage points by a total volume for all of the clusters.

20. The process of claim 19 further comprising:
 determining, using the at least one processor, an adjusted volume by identifying the cluster of one optimal set with a highest coverage and adding a coverage of the clusters of the other optimal sets; and
 dividing, using the at least one processor, the adjusted volume by a total coverage provided by the total set of the clusters.

* * * * *